(12) United States Patent
Naito et al.

(10) Patent No.: US 12,240,209 B2
(45) Date of Patent: Mar. 4, 2025

(54) LIQUID STORAGE BAG

(71) Applicant: SEIKO EPSON CORPORATION, Tokyo (JP)

(72) Inventors: Naoki Naito, Kitaazumi-gun (JP); Yuji Aoki, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 174 days.

(21) Appl. No.: 17/988,500

(22) Filed: Nov. 16, 2022

(65) Prior Publication Data

US 2023/0150248 A1 May 18, 2023

(30) Foreign Application Priority Data

Nov. 17, 2021 (JP) ................................. 2021-186881

(51) Int. Cl.
| | | |
|---|---|---|
| *B32B 27/08* | (2006.01) | |
| *B32B 7/12* | (2006.01) | |
| *B32B 27/32* | (2006.01) | |
| *B32B 27/34* | (2006.01) | |
| *B32B 27/36* | (2006.01) | |
| *B65D 75/26* | (2006.01) | |

(52) U.S. Cl.
CPC ............... *B32B 27/08* (2013.01); *B32B 7/12* (2013.01); *B32B 27/32* (2013.01); *B32B 27/34* (2013.01); *B32B 27/36* (2013.01); *B65D 75/26* (2013.01); *B32B 2250/24* (2013.01); *B32B 2255/10* (2013.01); *B32B 2255/20* (2013.01); *B32B 2307/4023* (2013.01); *B32B 2439/46* (2013.01)

(58) Field of Classification Search
CPC .......... B32B 27/08; B32B 7/12; B32B 27/32; B32B 27/34; B32B 27/36; B32B 2250/24; B32B 2255/10; B32B 2255/20; B32B 2307/4023; B32B 2439/46; B32B 27/38; B32B 27/40; B32B 2255/26; B65D 75/26; B41J 2/17503
See application file for complete search history.

(56) References Cited

U.S. PATENT DOCUMENTS

2006/0092244 A1    5/2006   Nakajima

FOREIGN PATENT DOCUMENTS

| JP | 2011126211 A | * | 6/2011 |
| JP | 2020-083389 A |  | 6/2020 |
| WO | 2006/046464 A1 |  | 5/2006 |

OTHER PUBLICATIONS

Iwase Fumiyoshi, Ink Storage Container, Jun. 30, 2011, [Abstract and Description of Embodiments] (Year: 2011).*

* cited by examiner

*Primary Examiner* — Lisa Solomon
(74) *Attorney, Agent, or Firm* — Oliff PLC

(57) ABSTRACT

A liquid storage bag includes a bag configured to store a liquid and a feeder that feeds the liquid in the bag to an external component. The bag is formed of a film. The film includes a first base layer, a second base layer, and a first black layer located between the first base layer and the second base layer. The first black layer is formed of a black colorant filling a layer surface of the second base layer.

5 Claims, 12 Drawing Sheets

LIQUID STORAGE BAG

The present application is based on, and claims priority from JP Application Serial Number 2021-186881, filed Nov. 17, 2021, the disclosure of which is hereby incorporated by reference herein in its entirety.

BACKGROUND

1. Technical Field

The present disclosure relates to a liquid storage bag that stores a liquid.

2. Related Art

An example of a liquid storage bag that can store ink, which is an example of a liquid, is an ink bag disclosed, for example, in International Publication No. 2006/046464. The ink bag has an ink storage portion, which is an example of a bag, and an ink outlet, which is an example of a feeder. The ink storage portion is formed of a multi-layer film, which is an example of a film. The multi-layer film includes a light shielding layer formed of polyethylene containing carbon black or aluminum.

Aluminum has high light shielding properties but is more costly than resin, for example. Polyethylene containing carbon black is also more costly than normal polyethylene because it involves a process of kneading carbon black into polyethylene.

SUMMARY

According to an aspect of the present disclosure, a liquid storage bag includes a bag configured to store a liquid and a feeder that feeds the liquid in the bag to an external component. The bag is formed of a film. The film includes a first base layer, a second base layer, and a black layer located between the first base layer and the second base layer. The black layer is formed of a colorant filling a layer surface of the second base layer.

DESCRIPTION OF EXEMPLARY EMBODIMENTS

Embodiment

Hereinafter, an embodiment of a liquid storage bag will be described with reference to the drawings. The liquid storage bag, for example, stores a liquid to be fed to a printer. The printer is, for example, an ink jet printer that prints by ejecting ink, which is an example of a liquid, onto a medium such as paper.

Figure 1:
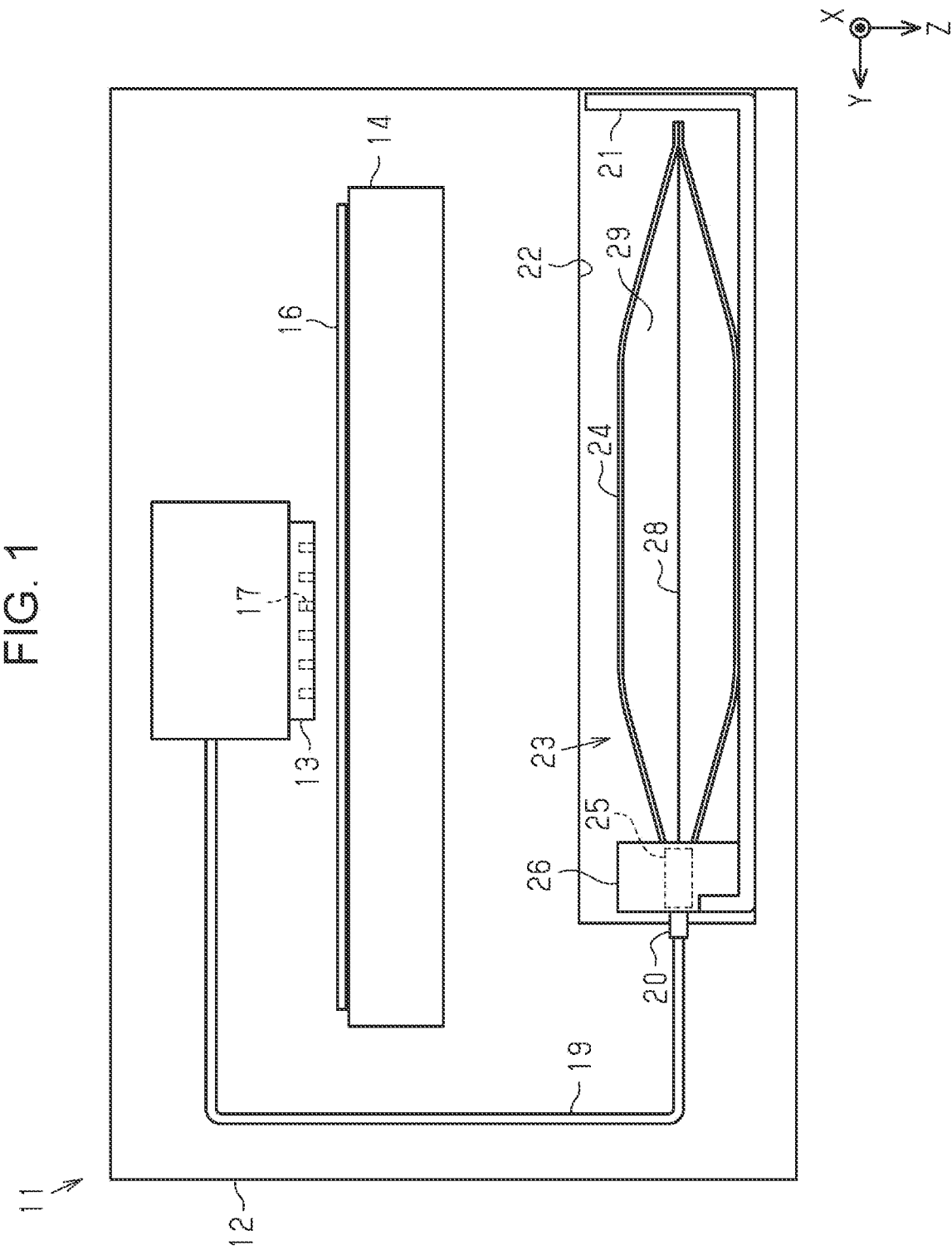
FIG. 1 is a schematic view illustrating an embodiment of a printer to which a liquid storage bag is attached.

In the drawings, the Z axis indicates the direction of gravity and the X axis and the Y axis indicate the direction along the horizontal plane with a printer 11 being placed on the horizontal plane. The X axis, the Y axis, and the Z axis are perpendicular to each other. As illustrated in FIG. 1, the printer 11 may include a housing 12, a liquid ejection head 13, and a support 14.

The support 14 supports a medium 16 being transported. The liquid ejection head 13 has nozzles 17. The liquid ejection head 13 can eject a liquid. The liquid ejection head 13 ejects a liquid through the nozzles 17 onto the medium 16 supported by the support 14 to print on the medium 16. The liquid ejection head 13 may be a serial head that prints by ejecting a liquid while moving. The liquid ejection head 13 may be a line head that is long in the width direction of the medium 16 and prints by ejecting a liquid onto the medium 16 being transported.

The printer 11 may include a feed passage 19, a feed needle 20, a tray 21, and an attachment portion 22. A liquid is fed from the liquid storage bag 23, which stores the liquid, to the liquid ejection head 13 through the feed passage 19.

The feed needle 20 is located at the upstream end of the feed passage 19. The tray 21 is detachably attached to the attachment portion 22. The tray 21 supports the liquid storage bag 23. In other words, the liquid storage bag 23 is placed on the tray 21. The liquid storage bag 23 is connected to the feed needle 20 when the tray 21 having the liquid storage bag 23 thereon is attached to the attachment portion 22.

The liquid storage bag 23 includes a bag 24 and a feeder 25. The liquid storage bag 23 may have an auxiliary component 26. The bag 24 can store a liquid. The bag 24 is, for example, a gusset bag that has a depth 29 with a crease 28.

The feeder 25 feeds a liquid in the bag 24 to an external component. The auxiliary component 26 assists connection between the feeder 25 and the feed needle 20. The auxiliary component 26 positions the feeder 25 relative to the tray 21, enabling the feeder 25 to be readily connected to the feed needle 20 when the tray 21 is attached.

Figure 2:
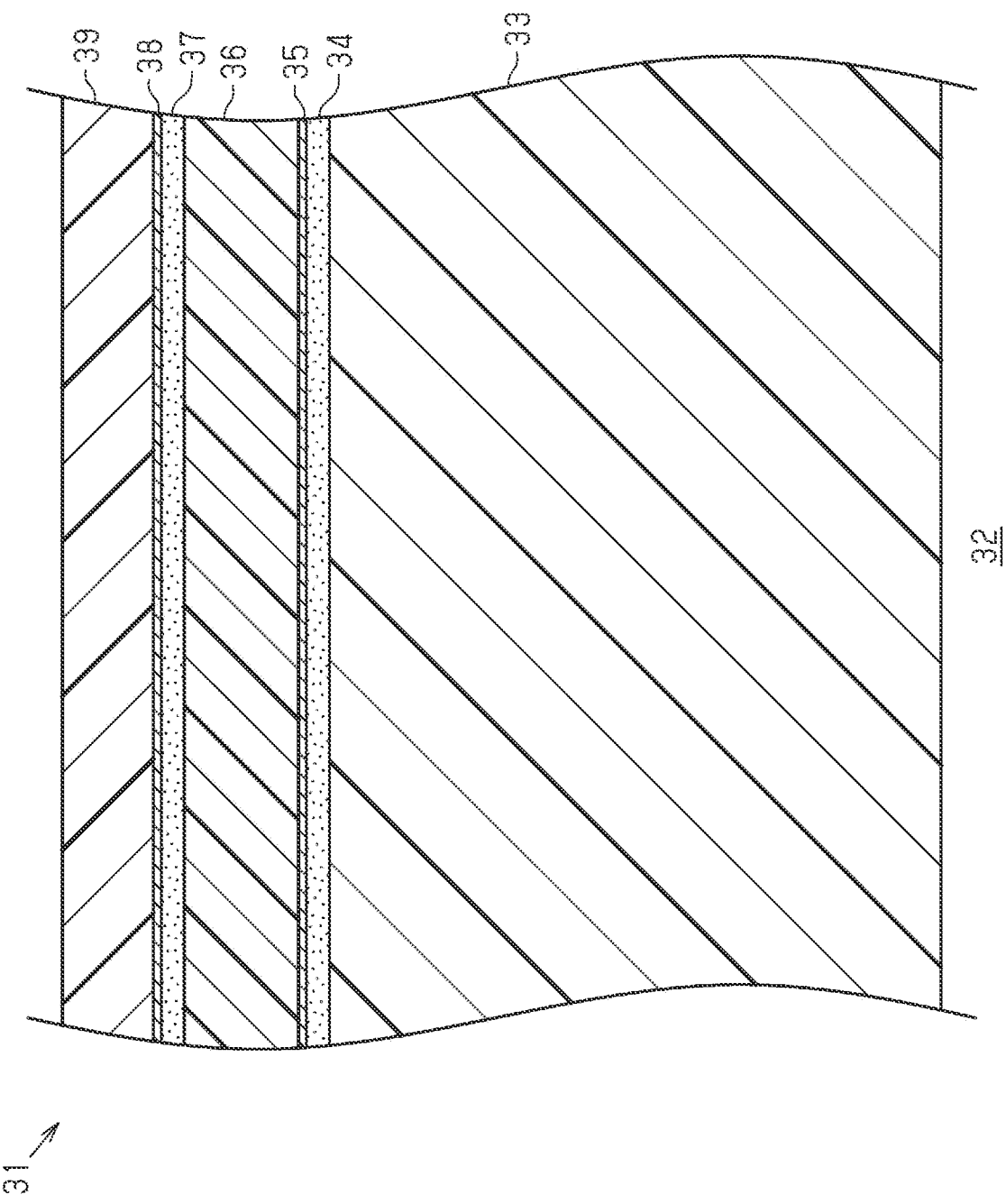
FIG. 2 is a schematic cross-sectional view illustrating a film.

As illustrated in FIG. 2, the bag 24 is formed of a film 31. The bag 24 may be formed of a single-layer or multi-layer film 31, and the film 31 forms a storage space 32 that can store a liquid. The film 31 may include, in this order from the side adjacent to the storage space 32, a first base layer 33, a first adhesive layer 34, a second black layer 35, a third base layer 36, a second adhesive layer 37, a first black layer 38, which is an example of a black layer, and a second base layer 39. The layers are stacked on top of another in the thickness direction of the film 31. In this embodiment, when the film 31 is placed flat, surfaces of the respective layers perpendicular to the thickness direction may be called layer surfaces. In the film 31 according to this embodiment, a side adjacent to the storage space 32 may be called an inner side and a side away from the storage space 32 may be called an outer side.

The first base layer 33 may be the inner most layer. The inner layer surface of the first base layer 33 is in contact with a liquid in the storage space 32. The first base layer 33 may be formed of polyethylene. Polyethylene has resistance to, for example, an ultraviolet curable ink, which is an example of a liquid. In other words, polyethylene limits transmission of ultraviolet rays, protecting a liquid such as an ultraviolet curable ink in the storage space 32. Polyethylene has high heat shielding properties. This enables easy formation of the bag 24 because the inner most layers, or the first base layers 33 formed of polyethylene can be bonded together by heat.

The first adhesive layer 34 may attach the first base layer 33 and the second black layer 35 together. The first adhesive layer 34 of this embodiment attaches the outer layer surface of the first base layer 33 to the second black layer 35. The first adhesive layer 34 joins the third base layer 36 having the second black layer 35 on the inner layer surface to the first base layer 33.

The second black layer 35 is located between the first base layer 33 and the third base layer 36. The third base layer 36 is located between the first base layer 33 and the second base layer 39, and thus it also could be said that the second black layer 35 is located between the first base layer 33 and the second base layer 39. The second black layer 35 of this embodiment is formed of a black colorant that fills the inner layer surface of the third base layer 36. The second black layer 35 may be formed over the entire layer surface of the third base layer 36 or may be formed over the layer surface of the third base layer 36 except for a portion such as an end.

The third base layer 36 may be located outwardly from the first base layer 33. The third base layer 36 may be located between the first base layer 33 and the second base layer 39. The third base layer 36 may be formed of nylon. Nylon has resistance to oil and puncture.

The second adhesive layer 37 may attach the third base layer 36 and the first black layer 38 together. The second adhesive layer 37 of this embodiment attaches the outer layer surface of the third base layer 36 to the first black layer 38 together. The second adhesive layer 37 joins the second base layer 39 having the first black layer 38 on the inner layer surface to the third base layer 36. The first adhesive layer 34 and the second adhesive layer 37 may be formed of a urethan-based adhesive, an ester-based adhesive, an ethylene-based adhesive, or an epoxy-based adhesive, for example.

The first black layer 38 is located between the second base layer 39 and the third base layer 36. The third base layer 36 is located between the first base layer 33 and the second base layer 39, and thus the first black layer 38 is located between the first base layer 33 and the second base layer 39. The first black layer 38 of this embodiment is formed of a black colorant that fills the inner layer surface of the second base layer 39. The first black layer 38 may be formed over the entire layer surface of the second base layer 39 or may be formed over the layer surface of the second base layer 39 except for a portion such as an end.

The first black layer 38 and the second black layer 35 may be formed of the same colorant or different colorants. The black colorant may contain carbon, iron black, or pine soot, for example. The black colorant may be a mixture of different colors of colorants. The black colorant may include different colors of colorants applied in layers on the layer surface of the second base layer 39 or the third base layer 36.

The first black layer 38 and the second black layer 35 may be formed by application of paint containing a black colorant onto the layer surfaces. The first black layer 38 and the second black layer 35 may be formed by printing. For example, ink containing a black colorant may fill the layer surfaces to form the first black layer 38 and the second black layer 35.

The first black layer 38 and the second black layer 35 may have the same light absorbance and the same thickness or may have different light absorbances and thicknesses. For example, when the first black layer 38 and the second black layer 35 are formed of the same colorant, paint containing the colorant may be applied in layers to increase the light absorbance.

The second base layer 39 may be located outwardly from the first base layer 33. The outer layer surface of the second base layer 39 may be exposed to the ambient air. The second base layer 39 may be formed of polyethylene terephthalate having surface deposited alumina. Alumina may cover at least one of an outer surface and an inner surface of the polyethylene terephthalate. The polyethylene terephthalate having the deposited alumina has oxygen and vapor barrier properties and impact and vibration resistances.

Operation of Embodiment

Operation of the embodiment will be described. The liquid storage bag 23 stores a liquid in the storage space 32. The bag 24 having the storage space 32 is formed of the film 31. The film 31 protects the liquid in the storage space 32 with the first and second black layers 38 and 35 that block light from the outside.

Advantages of Embodiment

Advantages of the embodiment will be described. (1) The film 31 forming the bag 24 includes the first black layer 38. The first black layer 38 is formed of a colorant filling the layer surface of the second base layer 39. This is less costly than employment of a metal film or employment of a colored second base layer, for example. The black colorant has higher light-shielding properties than colorants of the other colors. Thus, this embodiment reduces an increase in the cost and has light-shielding properties.

(2) The film 31 includes the first black layer 38 and the second black layer 35. In other words, the film 31 has multiple black layers and thus has higher light-shielding properties than a film 31 having one black layer.

(3) Polyethylene limits transmission of ultraviolet rays. The first base layer 33 that is formed of polyethylene reduces ultraviolet rays passing through the bag 24.

(4) Polyethylene terephthalate having deposited alumina has impact and vibration resistance. The second base layer 39 on the outer side is formed of polyethylene terephthalate having deposited alumina, increasing the strength of the bag 24.

(5) Nylon has resistance to puncture. The third base layer 36 located between the first base layer 33 and the second base layer 39 is formed of nylon, reducing the possibility that the bag 24 will have a hole.

Modifications

The present embodiment may be modified as follows. The embodiment and the modifications below may be combined without involving technical inconsistency.

First Modification

Figure 3:
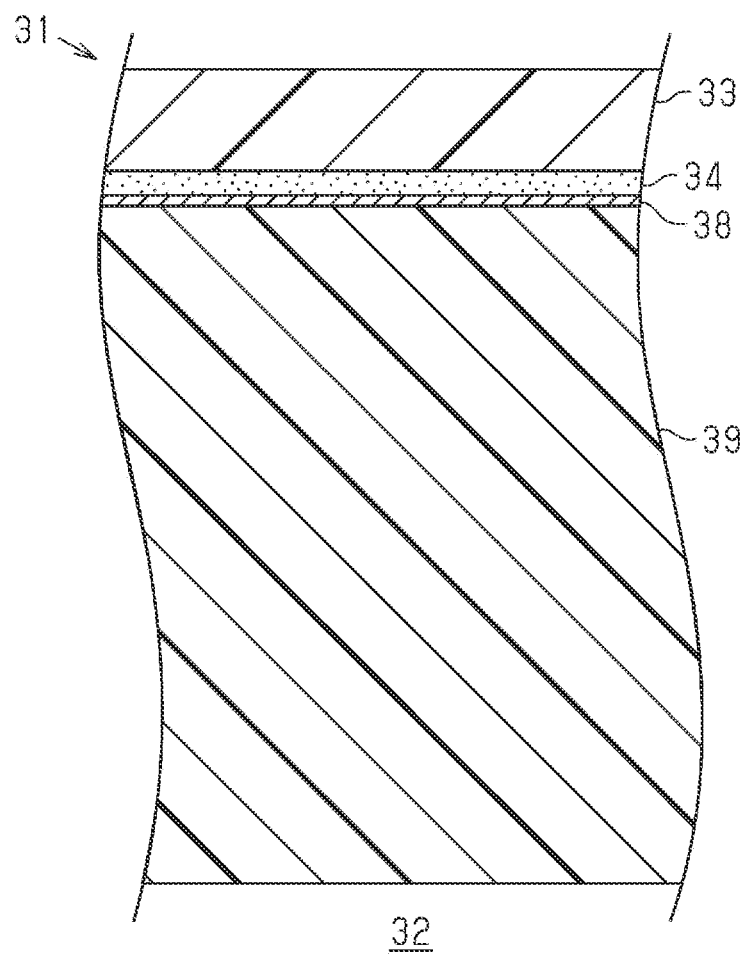
FIG. 3 is a schematic cross-sectional view illustrating a film according to a first modification.

As illustrated in FIG. 3, the film 31 may include, in this order from the side adjacent to the storage space 32, the second base layer 39, the first black layer 38, the first adhesive layer 34, and the first base layer 33. The first base layer 33 may be formed of polyethylene terephthalate having deposited alumina or nylon. The second base layer 39 may be formed of polyethylene. The first black layer 38 is located between the first base layer 33 and the second base layer 39. The first black layer 38 may be formed on the outer layer surface of the second base layer 39.

Second Modification

Figure 4:
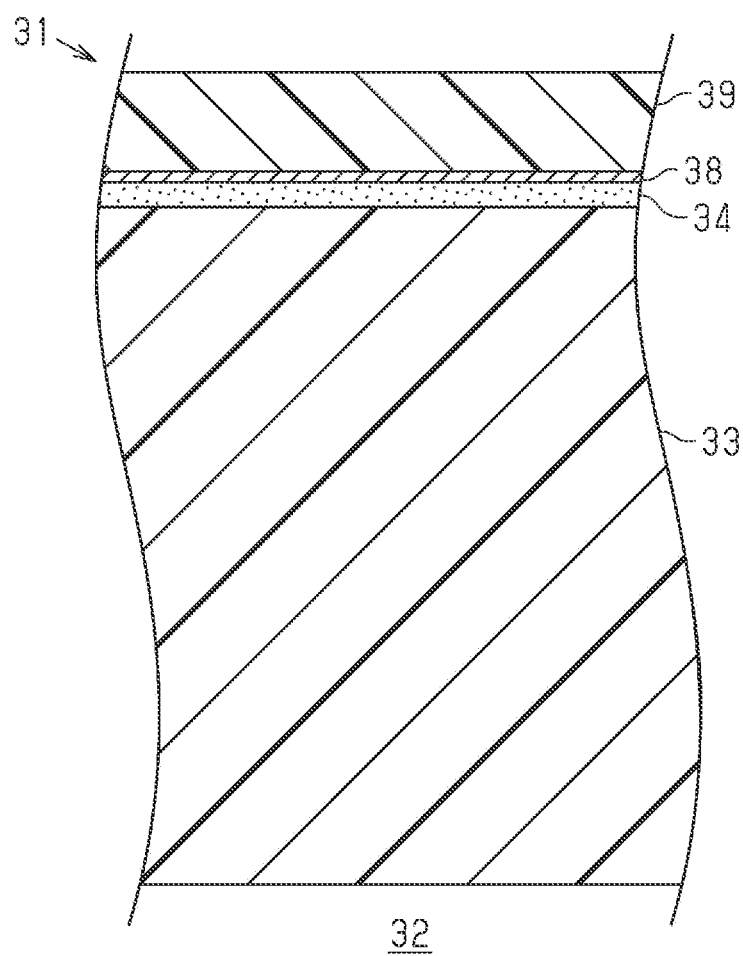
FIG. 4 is a schematic cross-sectional view illustrating a film according to a second modification.

As illustrated in FIG. 4, the film 31 may include, in this order from the side adjacent to the storage space 32, the first base layer 33, the first adhesive layer 34, the first black layer 38, and the second base layer 39. The first base layer 33 may be formed of polyethylene. The second base layer 39 may be formed of polyethylene terephthalate having deposited alumina or nylon. The first black layer 38 is located between the first base layer 33 and the second base layer 39. The first black layer 38 may be formed on the inner layer surface of the second base layer 39.

Third Modification

Figure 5:
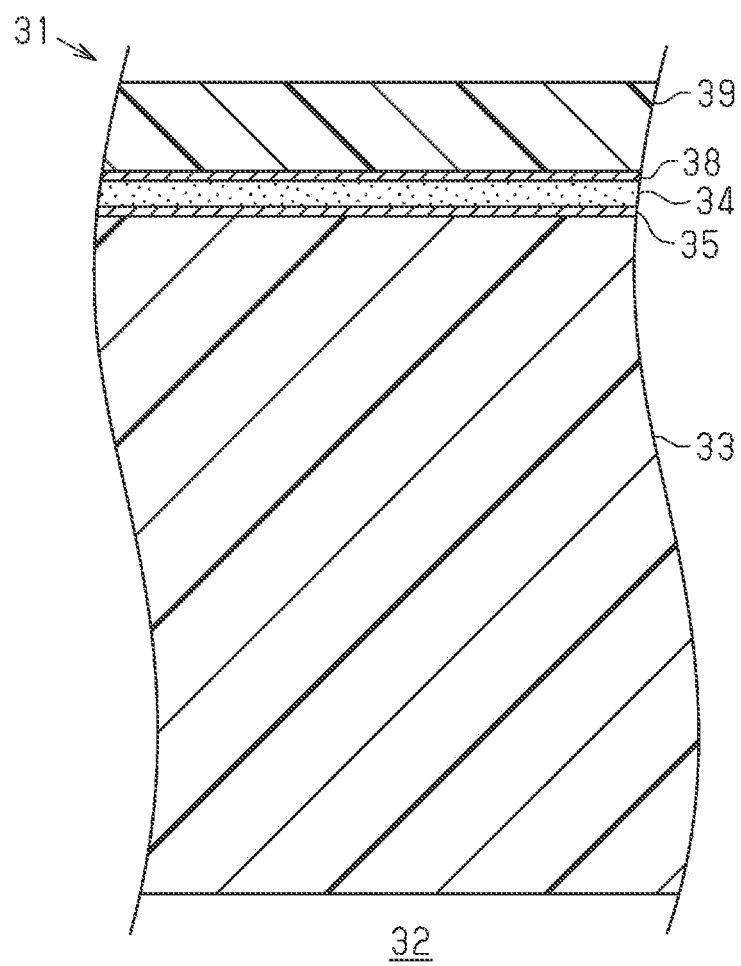
FIG. 5 is a schematic cross-sectional view illustrating a film according to a third modification.

As illustrated in FIG. 5, the film 31 may include the second black layer 35 in addition to the configuration of the second modification. In other words, the film 31 may include, in this order from the side adjacent to the storage space 32, the first base layer 33, the second black layer 35, the first adhesive layer 34, the first black layer 38, and the second base layer 39. The first black layer 38 and the second black layer 35 are located between the first base layer 33 and the second base layer 39. The second black layer 35 may be formed on the outer layer surface of the first base layer 33.

Fourth Modification

Figure 6:
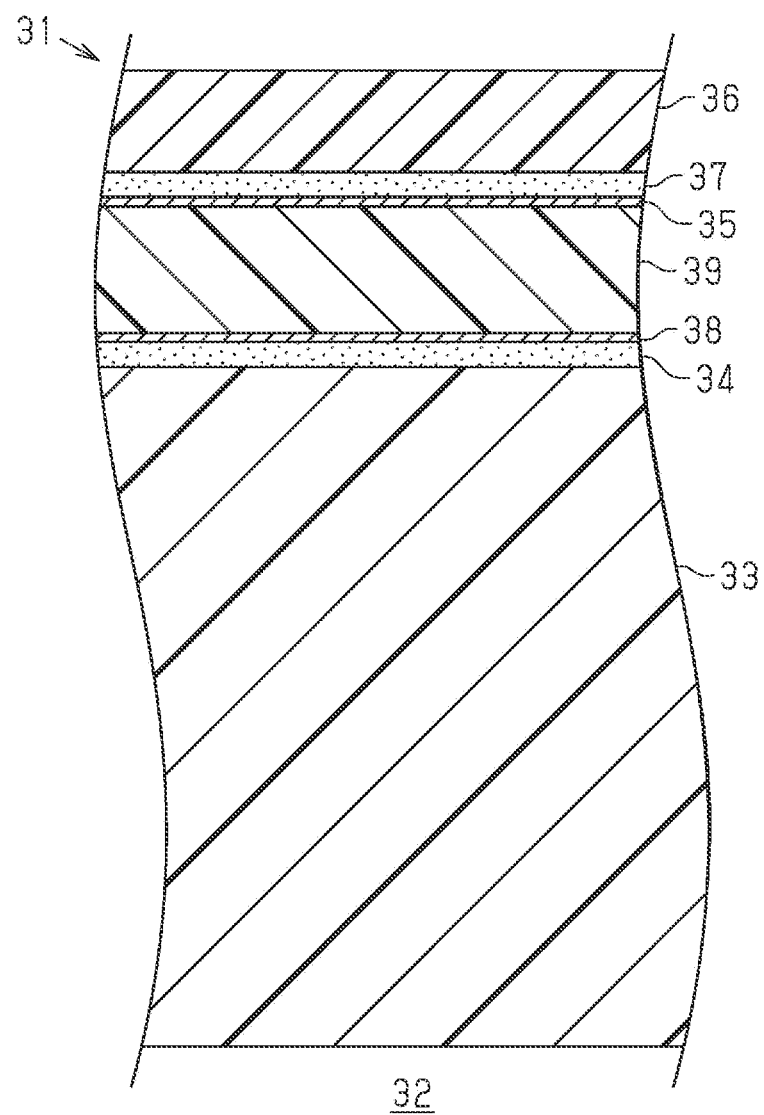
FIG. 6 is a schematic cross-sectional view illustrating a film according to a fourth modification.

As illustrated in FIG. 6, the film 31 may include, in this order from the side adjacent to the storage space 32, the first base layer 33, the first adhesive layer 34, the first black layer 38, the second base layer 39, the second black layer 35, the second adhesive layer 37, and the third base layer 36. The second base layer 39 may be located between the first base layer 33 and the third base layer 36. The third base layer 36 may be located outwardly from the first base layer 33 and the second base layer 39. The first base layer 33 may be formed of polyethylene. The second base layer 39 may be formed of nylon. The third base layer 36 may be formed of polyethylene terephthalate having deposited alumina. The first black layer 38 and the second black layer 35 may be formed on the second base layer 39. In other words, the first black layer 38 may be formed on the inner layer surface of the second base layer 39. The first black layer 38 is located between the first base layer 33 and the second base layer 39. The second black layer 35 may be formed on the outer layer surface of the second base layer 39.

Fifth Modification

Figure 7:
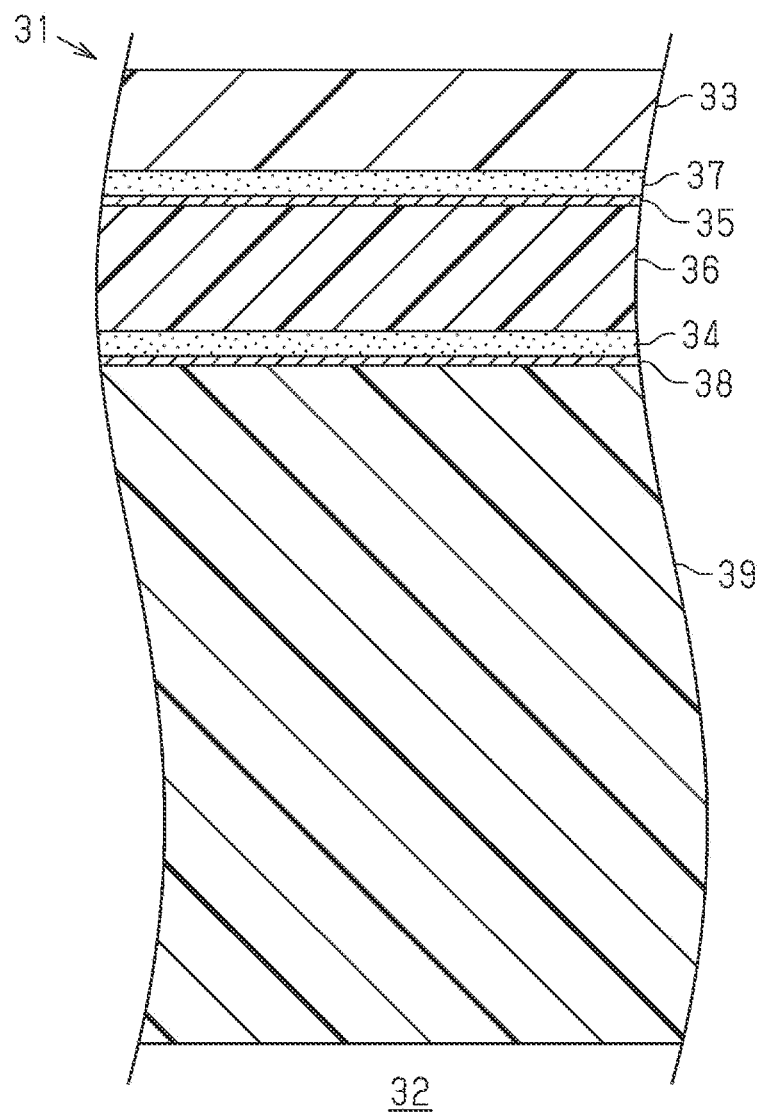
FIG. 7 is a schematic cross-sectional view illustrating a film according to a fifth modification.

As illustrated in FIG. 7, the film 31 may include, in this order from the side adjacent to the storage space 32, the second base layer 39, the first black layer 38, the first adhesive layer 34, the third base layer 36, the second black layer 35, the second adhesive layer 37, and the first base layer 33. The second base layer 39 and the third base layer 36 may be located inwardly from the first base layer 33. In other words, the second base layer 39 and the third base layer 36 may be located between the first base layer 33 and the storage space 32. The first base layer 33 may be formed of polyethylene terephthalate having deposited alumina. The second base layer 39 may be formed of polyethylene. The third base layer 36 may be formed of nylon. The first black layer 38 and the second black layer 35 may be located between the first base layer 33 and the second base layer 39. The first black layer 38 may be formed on the outer layer surface of the second base layer 39. The second black layer 35 may be formed on the outer layer surface of the third base layer 36.

Sixth Modification

Figure 8:
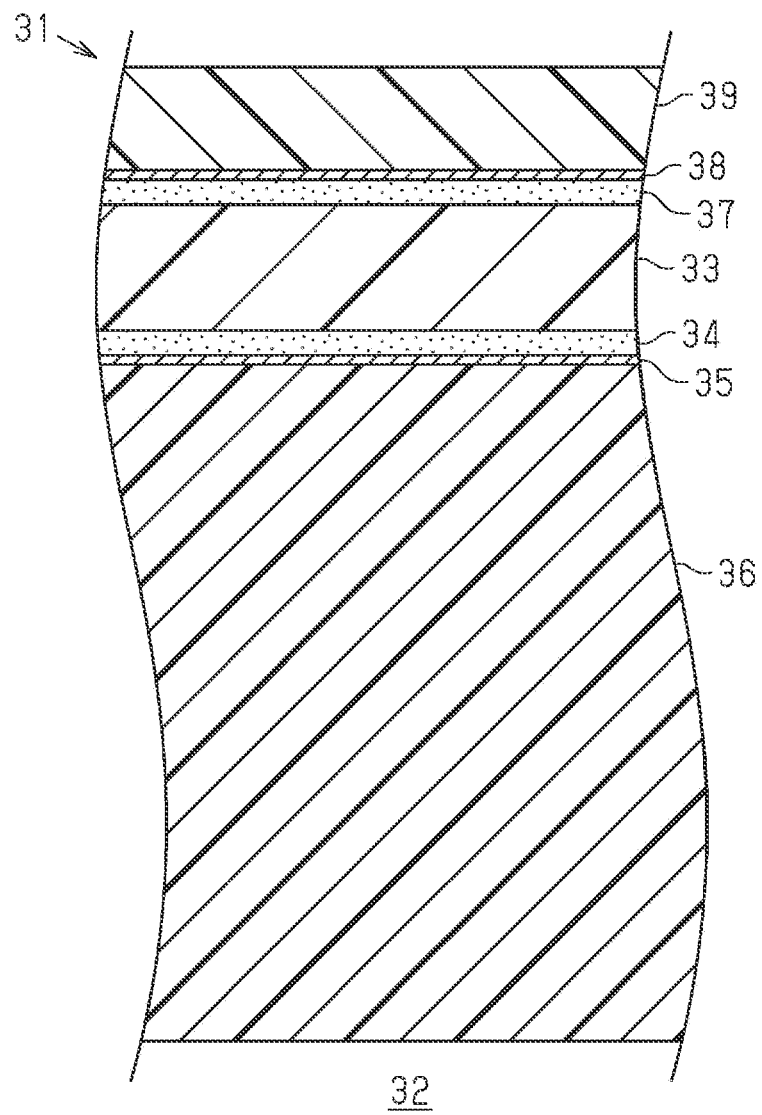
FIG. 8 is a schematic cross-sectional view illustrating a film according to a sixth modification.

As illustrated in FIG. 8, the film 31 may include, in this order from the side adjacent to the storage space 32, the third base layer 36, the second black layer 35, the first adhesive layer 34, the first base layer 33, the second adhesive layer 37, the first black layer 38, and the second base layer 39. The first base layer 33 may be located between the second base layer 39 and the third base layer 36. The second base layer 39 may be located outwardly from the first base layer 33. The first base layer 33 may be formed of nylon. The second base layer 39 may be formed of polyethylene terephthalate having deposited alumina. The third base layer 36 may be formed of polyethylene. The first black layer 38 is located between the first base layer 33 and the second base layer 39. The first black layer 38 may be formed on the inner layer surface of the second base layer 39. The second black layer 35 may be formed on the outer layer surface of the third base layer 36.

Seventh Modification

Figure 9:
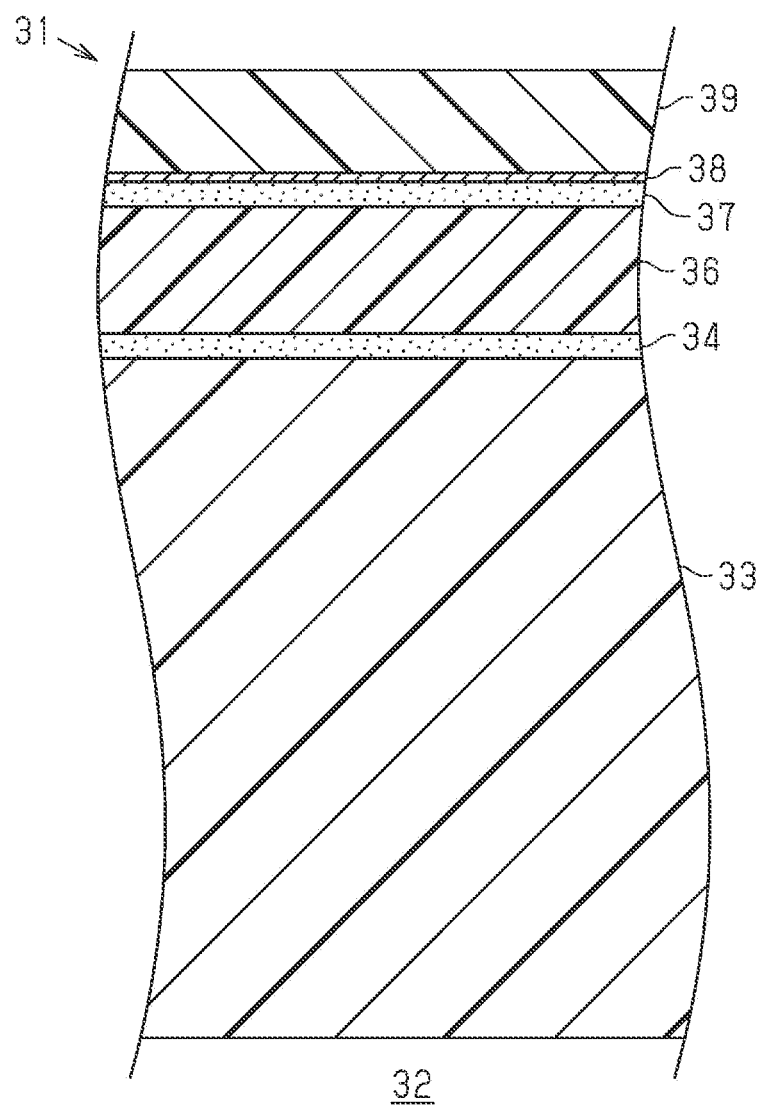
FIG. 9 is a schematic cross-sectional view illustrating a film according to a seventh modification.

As illustrated in FIG. 9, the film 31 may include, in this order from the side adjacent to the storage space 32, the first base layer 33, the first adhesive layer 34, the third base layer 36, the second adhesive layer 37, the first black layer 38, and the second base layer 39. The first base layer 33 may be formed of polyethylene. The second base layer 39 may be formed of polyethylene terephthalate having deposited alumina. The third base layer 36 may be formed of nylon. The first black layer 38 is located between the first base layer 33 and the second base layer 39. The first black layer 38 may be formed on the inner layer surface of the second base layer 39.

Eighth Modification

Figure 10:
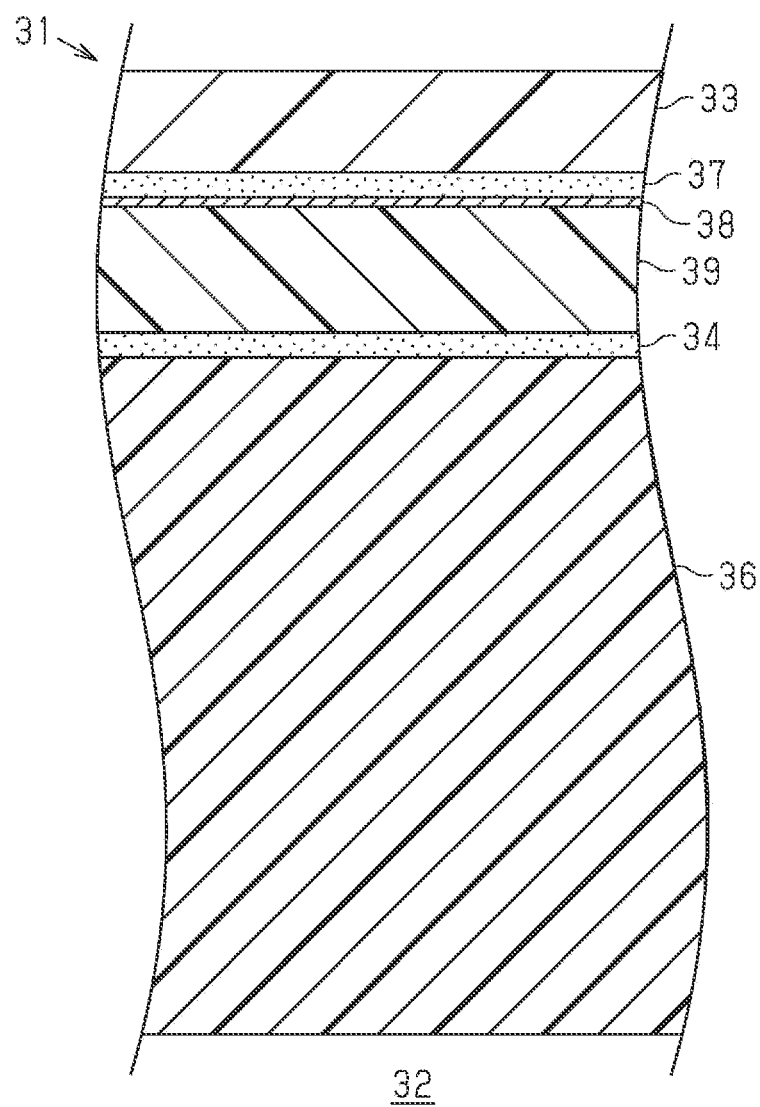
FIG. 10 is a schematic cross-sectional view illustrating a film according to an eighth modification.

As illustrated in FIG. 10, the film 31 may include, in this order from the side adjacent to the storage space 32, the third base layer 36, the first adhesive layer 34, the second base layer 39, the first black layer 38, the second adhesive layer 37, and the first base layer 33. The first base layer 33 may be formed of polyethylene terephthalate having deposited alumina. The second base layer 39 may be formed of nylon. The third base layer 36 may be formed of polyethylene. The first black layer 38 is located between the first base layer 33 and the second base layer 39. The first black layer 38 may be formed on the outer layer surface of the second base layer 39.

Ninth Modification

Figure 11:
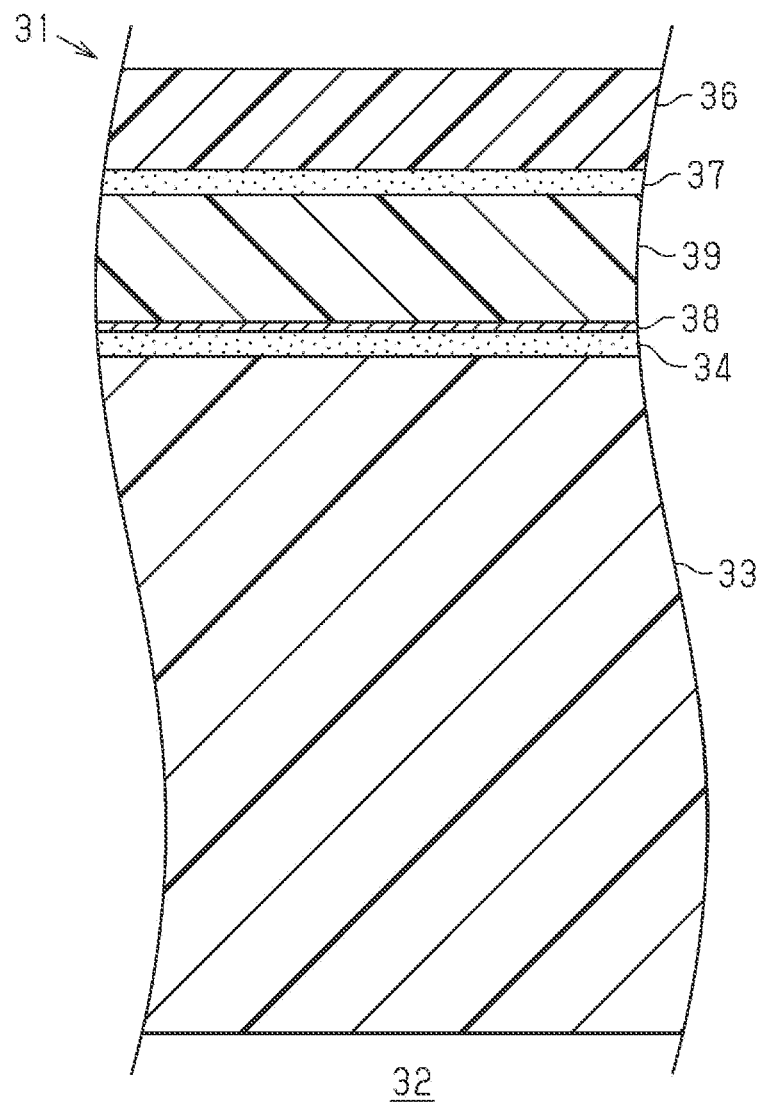
FIG. 11 is a schematic cross-sectional view illustrating a film according to a ninth modification.

As illustrated in FIG. 11, the film 31 may include, in this order from the side adjacent to the storage space 32, the first base layer 33, the first adhesive layer 34, the first black layer 38, the second base layer 39, the second adhesive layer 37, and the third base layer 36. The first base layer 33 may be formed of polyethylene. The second base layer 39 may be formed of nylon. The third base layer 36 may be formed of polyethylene terephthalate having deposited alumina. The first black layer 38 is located between the first base layer 33 and the second base layer 39. The first black layer 38 may be formed on the inner layer surface of the second base layer 39.

Tenth Modification

Figure 12:
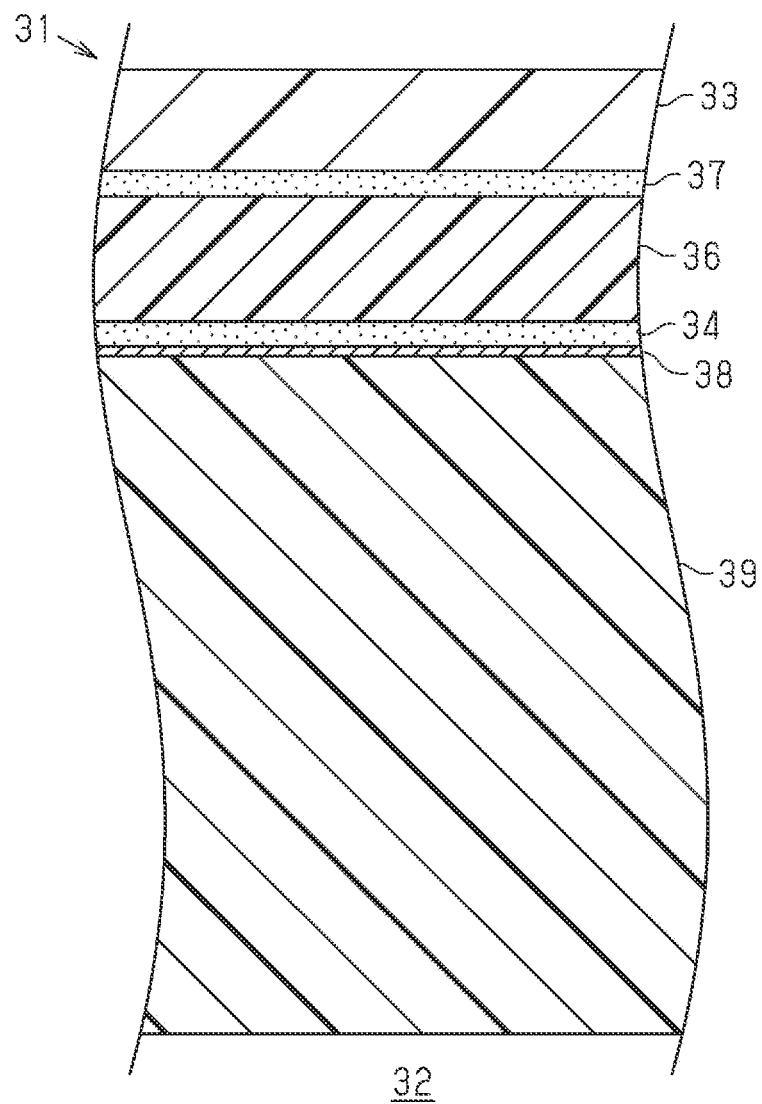
FIG. 12 is a schematic cross-sectional view illustrating a film according to a tenth modification.

As illustrated in FIG. 12, the film 31 may include, in this order from the side adjacent to the storage space 32, the second base layer 39, the first black layer 38, the first adhesive layer 34, the third base layer 36, the second adhesive layer 37, and the first base layer 33. The first base layer 33 may be formed of polyethylene terephthalate having deposited alumina. The second base layer 39 may be formed of polyethylene. The third base layer 36 may be formed of nylon. The first black layer 38 is located between the first base layer 33 and the second base layer 39. The first black layer 38 may be formed on the outer layer surface of the second base layer 39.

Other Modifications

In the above-described embodiment, the second black layer 35 may be formed on the outer layer surface of the third base layer 36.

In the fifth modification, the second black layer 35 may be formed on the inner layer surface of the third base layer 36.

The film 31 may include three or more black layers. For example, in the above-described embodiment, the black layer may also be formed on at least one of the outer layer surface of the first base layer 33 and the outer layer surface of the third base layer 36. In the fourth modification, the black layer may also be formed on at least one of the outer layer surface of the first base layer 33 and the inner layer surface of the third base layer 36. In the fifth modification, the black layer may also be formed on at least one of the inner layer surface of the first base layer 33 and the inner layer surface of the third base layer 36.

In the above-described embodiment and modifications, the first base layer 33, the second base layer 39, and the third base layer 36 may be formed of any resin. For example, the first, second, and third base layers 33, 39, and 36 may be formed of polyethylene terephthalate, polyvinyl alcohol, polypropylene, or polystyrene, for example.

At least one of the first adhesive layer 34 and the second adhesive layer 37 may be eliminated from the film 31. For example, a melted resin, which is a material of the first base layer 33, may be pressure bonded while being on the first black layer 38 formed on the second base layer 39 to form the first base layer 33.

The liquid in the liquid storage bag 23 may be a substance in a liquid phase, and examples of the liquid include a substance in liquid form that has high or low viscosity, and a substance in fluid form such as sol, gel water, other inorganic solvents, organic solvents, solutions, liquid resins, liquid metals, and metallic melts. The liquid is not limited to a liquid, which is a state of substance, but may be a liquid in which particles of a functional material formed of solids such as a pigment and a metal particle are dissolved, dispersed, or mixed in a solvent. Representative examples of the liquid include ink and liquid crystals. "Ink" includes various liquid compositions, such as a common water-based ink, an oil-based ink, a gel ink, or a hot melt ink.

Supplementary Note

The following describes technical ideas understood from the above-described embodiment and modifications and their operations and advantages.

(A) A liquid storage bag includes a bag configured to store a liquid and a feeder that feeds the liquid in the bag to an external component. The bag is formed of a film. The film includes a first base layer, a second base layer, and a black layer located between the first base layer and the second base layer. The black layer is formed of a black colorant filling a layer surface of the second base layer.

In this configuration, the film forming the bag includes the black layer. The black layer is formed of a colorant filling the layer surface of the second base layer. This is less costly than employment of a metal film or employment of a colored second base layer, for example. The black colorant has higher light-shielding properties than colorants of the other colors. Thus, the embodiment reduces an increase in the cost and has light-shielding properties.

(B) In the liquid storage bag, the black layer is a first black layer, and the film may include a third base layer and a second black layer formed of a black colorant filling a layer surface of the third base layer.

In this configuration, the film includes the first black layer and the second black layer. In other words, the film has multiple black layers and thus has higher light-shielding properties than a film having one black layer.

(C) In the liquid storage bag, the first base layer may be formed of polyethylene. Polyethylene limits transmission of ultraviolet rays. In this configuration, the first base layer that is formed of polyethylene reduces ultraviolet rays passing through the bag.

(D) In the liquid storage bag, the second base layer may be located outwardly from the first base layer and may be formed of polyethylene terephthalate having surface deposited alumina. Polyethylene terephthalate having deposited alumina has impact and vibration resistance. In this configuration, the second base layer on the outer side is formed of polyethylene terephthalate having deposited alumina, increasing the strength of the bag.

(E) In the liquid storage bag, the third base layer may be located between the first base layer and the second base layer and may be formed of nylon. Nylon has resistance to puncture. In this configuration, the third base layer located between the first base layer and the second base layer is formed of nylon, reducing the possibility that the bag will have a hole.

What is claimed is:

1. A liquid storage bag comprising:
   a bag configured to store a liquid; and
   a feeder that feeds the liquid in the bag to an external component, wherein
   the bag is formed of a film,
   the film includes a first base layer, a second base layer, and a first black layer located between the first base layer and the second base layer,
   the first black layer is formed of a black colorant filling a layer surface of the second base layer,
   the film further includes a third base layer and a second black layer that is formed of the black colorant filling a layer surface of the third base layer, and
   the black colorant contains carbon, iron black or pine soot.

2. The liquid storage bag according to claim 1, wherein the first base layer is formed of polyethylene.

3. The liquid storage bag according to claim 1, wherein the second base layer is located outwardly from the first base layer and is formed of polyethylene terephthalate having surface deposited alumina.

4. The liquid storage bag according to claim 1, wherein the third base layer is located between the first base layer and the second base layer and is formed of nylon.

5. The liquid storage bag according to claim 1, wherein the first black layer and the second black layer are formed of a same black colorant.

\* \* \* \* \*